Patented Sept. 5, 1933

1,925,707

UNITED STATES PATENT OFFICE 1,925,707

VULCANIZING RUBBER

George H. Stevens, Newark, N. J.

No Drawing. Application February 29, 1928
Serial No. 258,148

10 Claims. (Cl. 18—53)

This invention relates to improvements in the use of organic nitrogenous substances that assist in or accelerate the vulcanization of rubber, and has for its object the utilization of new chemical reactions and products to this end.

This specification is a continuation in part of Ser. No. 651,968 filed July 16, 1923, relating to the use of mono- and tri-substituted guanidines in combination.

Tri-phenyl guanidine ($C_{19}H_{17}N_3$), has been known for a long time as an accelerator, but the results obtained from the use of it are not equal to that of many other accelerators that are just as available for use, and while it has over 14% of nitrogen it still fails to rate with the best of them. Its melting point too is higher than it should be for marked activity in vulcanization.

In a previous application (Ser. No. 399,979), filed July 30, 1920, I have mentioned mono-phenyl guanidine ($C_7H_9N_3$), as a rubber accelerator, having a nitrogen content of 31% and but little used.

Here then were two nitrogenous, organic bodies, more or less related in their chemical structure, and an examination of their properties and decomposition products showed that the most natural and logical thing to do would be to combine them, and find properties present then more conducive to effecting an accelerated vulcanization than is found in either when used alone.

Mono-phenyl guanidine has a melting point of 66° C., and a nitrogen content of 31%, while the melting point of tri-phenyl guanidine is 143° C., and the nitrogen content 14.6%. The former is quite hydroscopic and soluble in water. The latter is practically non-hygroscopic and only slightly soluble in water.

Mono-phenyl guanidine decomposes readily at a temperature a little above its melting point and in so doing splits off ammonia, with carbomonophenylimide (or its equivalent phenyl cyanamide, or cyanilide, ($C_7H_6N_2$) as the main decomposition product, of very low melting point and readily polymerizable to a much higher melting point. Its tri-molecular polymerization product being a melamine with three phenyl groups or substitutions.

Tri-phenyl guanidine, while it does not decompose at as low a temperature as the mono-phenyl guanidine, nevertheless decomposes readily at vulcanizing temperatures and splits off aniline, with its main decomposition product as carbodiphenylimide (or its equivalent diphenylcyanamide $C_{13}H_{10}N_2$), also of very low melting point and readily polymerizable to a much higher melting point. Its tri-molecular polymerization product being a melamine with six phenyl groups or substitutions.

Carbomonophenylimide and carbodiphenylimide are both of them very reactive bodies and especially so in the presence of any amine decomposition products that may be present with them.

They will polymerize with each other in more than one molecular proportion, each will combine with either aniline or ammonia, and either will combine with more than one phenyl substituted guanidine.

The carbomonophenylimide and carbodiphenylimide polymerization products are also more or less reactive with the same bodies as their lower polymers.

The aniline and ammonia released with these two phenyl substituted carbodiimides is also reactive with more than one of the phenyl guanidines.

In the reactions then that follow, from a combination of mono-phenyl guanidine and tri-phenyl guanidine under vulcanization, and with a metallic oxide present, the result would appear to be largely as follows:

Decomposition of the mono-phenyl guanidine into carbomono-phenylimide and ammonia.

Decomposition of the tri-phenyl guanidine into carbodiphenylimide and aniline.

Combination of carbodiphenylimide with the nascent ammonia to di-phenyl guanidine, and probably combination of some of the carbomonophenylimide and nascent aniline also to di-phenyl guanidine.

Nascent di-phenyl guanidine (supposedly far more active than normal di-phenyl guanidine), might largely be the first product formed, though substantially only as an intermediate product, but subject to the same general trend of decomposition as any di-phenyl guanidine.

This normal decomposition of di-phenyl guanidine is authoritatively agreed upon as: First splitting up into carbomonophenylimide and aniline, and then carbodiphenylimide and ammonia being formed.

Recombination of some of the phenyl substituted carbodiimides with the nascent aniline, and with the nascent ammonia, may again produce substituted guanidines, but these in turn would decompose again until the gradual combination of the phenyl substituted carbodiimides with each other, would slowly eliminate them, while the aniline and ammonia would be more rapidly dissipated, and the products remaining then would appear to be largely, unchanged phenyl substituted guanidines, unchanged phenyl substituted carbodiimides, and the phenyl substituted carbodiimide combination products that possess melting points above that of the products started with, and of considerable stability.

In vulcanization then, this would indicate an early activity of the accelerator composed of mono-phenyl guanidine and tri-phenyl guanidine while the disassociation reactions were taking place and aniline and ammonia were being split off, than a reaction stage where the phenyl substituted carbodiimides were forming new products with the other components, and then an ultimate stage where the progressive reactions were accumulating higher melting bodies in place of the lower melting bodies started with.

These stages of reaction however are not to be understood as distinctly separate but are periods where the stated reactions may predominate.

Conflicting opinions exist as to what these ultimate bodies really are, for varying temperatures of vulcanization and different vapor pressures to which a vulcanization may be subjected, may somewhat change the order of decomposition of the mono- and tri-phenyl guanidines, and also change the speed of dissipation of the aniline or ammonia, or even change the order of recombination of the disassociation products, but all of these reactions take place substantially between but four important constituents, namely: carbomonophenylimide, carbodiphenylimide, aniline and ammonia.

It is plainly evident then that largely the same end may be attained in any of these reactions, and that variations in temperature and pressure must influence more the degree of such ultimate conversion than it would the production of any compounds other than would normally occur between these four products, and that ultimately tetra-phenyl melamine (tetra-phenyl tricarbodiimide) ($C_{27}H_{22}N_6$ M. P. 217° C.), may constitute a substantial part if the reaction is carried far enough.

Varying the percents of the two phenyl guanidines employed, will of course cause a variation in the quantity of the respective phenyl substituted carbodiimides liberated, as well as vary the quantity of aniline and ammonia split off, which in turn probably governs to a considerable extent the production of the higher melting resultant bodies that would be formed.

The foregoing relates to the two phenyl substituted guanidines mentioned and to their decomposition products.

However, much the same series of reactions seem to also take place between the two tolyl, and between the two xylil correspondingly substituted guanidines, as well as between any mono- and tri-aryl substituted guanidines that are homologous to them, the radicals or substituting groups of which are derived from primary phenyl amines and that necessarily will have more than six carbon atoms.

While aniline enters into the production of the phenyl substituted guanidines mentioned, and is also a decomposition product of them as well, in a like manner toluidine, xylidine, or the monamines homologous to aniline, bear a similar relation to the corresponding tolyl substituted, xylil substituted, or homologously substituted guanidines respectively, and are as frequently present with them.

Aniline and these homologues of aniline, in their chemical activity however, are not necessarily confined to reactions within their own group, for if they be present in a different group they may also cause reactions that result in compounds containing both of such homologous radicals or groups, as where combination is made between a mono-substituted guanidine and a trisubstituted guanidine, each of which might contain a different homologous radical or group.

Such combinations might be especially desirable, so that a low melting mono-substituted guanidine could bring down the melting point of a high melting tri-substituted guanidine, or vice versa as a "solid solution", and thus allow both to accelerate vulcanization at their maximum efficiency.

In my investigation of that series of compounds, of which the several examples have been mentioned, I have found that such a solid solution of mono-substituted guanidines and tri-substituted guanidines, where the substituting groups are of the phenyl, tolyl, xylil, or homologous aryl groups that may be derived from primary phenyl amines, do prove of unusual value in accelerating rubber vulcanization.

Mono-phenyl guanidine is readily made by desulphurizing mono-phenyl thiourea in the presence of ammonia (Feuerlein, Ber. 1879, 12, 1602).

Mono-tolyl thiourea, or mono-xylil thiourea, under the same desulphurizing procedure, give the corresponding mono-tolyl, or mono-xylil substituted guanidines respectively.

The mono-aryl substituted thioureas result from a union of the corresponding aryl substituted mustard oils (aryl substituted iso-thio cyanates) and ammonia.

Mono-phenyl guanidine is also made by combining mono-phenyl substituted carbodiimide and ammonia (Beilstein, 1883, II, 920). If the mono-substituted carbodiimide has a tolyl, xylil, or homologous aryl radical or substituting group in place of the phenyl group, a corresponding mono-tolyl, mono-xylil, or homologous mono-aryl substituted guanidine results, and with an alkyl substitution in the aryl group.

The benzene ring of the radical or substituting group in any aryl substituted guanidine, other than phenyl substituted guanidine, and homologous thereto, must contain at least one alkyl substituting group, and any such aryl substituted guanidine having an alkyl substitution, exists then in several different isomeric forms, the isomeric form depending upon the position that the alkyl group takes in its substitution of hydrogen of the benzene ring.

Another method of producing mono-phenyl guanidine is from cyanamide (carbodiimide), and aniline hydrochloride (McKee, Am. Chem. Jnl., 1901, 26, 221; Kaempf, Ber. 1904, 37, 1681; Richter, 1922, II, 104), the acid salt of course being neutralized to obtain the base.

Mono-phenyl guanidine is also a decomposition product of phenyl biguanide (Monatsh. 1891, 12, 17).

The most convenient way to make tri-phenyl guanidine is to desulphurize di-phenyl thiourea (thiocarbanilide), with litharge in the presence of aniline. This process is one in quite general commercial use.

A desulphurization of mono- and di-phenyl thiourea (without aniline), also gives the same phenyl substituted carbodiimides, as does the decomposition of the corresponding mono- and tri-phenyl guanidines.

Mono-tolyl guanidine, mono-xylil guanidine, or any mono-aryl substituted guanidine homologous to mono-phenyl guanidine, may in a like manner be produced under most any of these same mentioned processes, and the tri-aryl substituted guanidines homologous to tri-phenyl guanidine are produced by the same methods as are used for making tri-phenyl guanidine.

Mono-tolyl guanidine, of the normal mixture of isometric forms, has a melting point a little below that of mono-phenyl guanidine.

Tri-tolyl guanidine, of the normal mixture of isomeric forms, has a melting point about 20° below that of tri-phenyl guanidine.

These melting points vary slightly as the percents of the constituent isomers vary.

A combination then of these two phenyl guanidines into a solid solution, may be readily effected and in several different ways.

One manner of preparing the solid solution phenyl guanidine accelerator is to use molecular proportions, and take twice the molecular proportion of the lower melting or mono-phenyl guanidine, and one molecular proportion of the higher melting or tri-phenyl guanidine.

Reduced to specific quantities the proportions would be, about 15 ozs. of mono-phenyl guanidine and 16 ozs. of tri-phenyl guanidine.

The nitrogen content of the mixture then would be a little above 25% which would be rated very high in a suitable accelerator.

Should molecular proportions of the mono- and tri-phenyl guanidine be used, theoretically no aniline or ammonia would be left over, and theoretically an equal weight of nascent di-phenyl guanidine would result as one of the first combination products of the disassociation. The nitrogen content would then be over 19%.

As a large quantity of the low melting mono-phenyl guanidine (M. P. 66° C.), might lower the melting point of the combined product to such an extent as to possibly interfere with its usefulness, a less amount of it might be preferable.

To combine these two substituted guanidines into a solid solution, they may be melted together by heat, or be precipitated together from a salt solution of both, or they may be recovered from a mutual solvent of both, whereupon the resultant solid solution will then have a single or common melting point.

While the above proportions may seem to be the most desirable, yet the proportions may be changed considerably to meet various vulcanizing conditions.

These combinations of mono-phenyl guanidine and tri-phenyl guanidine, or mixtures of their equivalents as accelerators, appear then to derive much of their effectiveness from the peculiar circumstance that the disassociation inter-reactions between the two phenyl substituted guanidines cause the gradual formation, within the heated rubber, of nascent di-phenyl guanidine as an intermediate.

This intermediate di-phenyl guanidine forms then while the disassociation products are also forming, and the intermediate or nascent di-phenyl guanidine, or any similarly formed di-substituted guanidine homologous to di-phenyl guanidine, is capable of great activity, as it breaks up however, it follows then the usual disassociation course.

Combinations of the mono- and tri-substituted guanidines homologous to these phenyl substituted guanidines, show substantially the same reaction behavior under the same vulcanizing temperatures, and in using them they would be combined in the same way as the phenyl substituted guanidines.

The following representative formula shows the use of tolyl substituted guanidines in place of phenyl substituted guanidines, in a vulcanizable rubber mixture.

82 lbs. smoked sheets
5 lbs. zinc oxide
7 lbs. barytes
5½ lbs. sulphur
2½ oz. mono-tolyl guanidine   Combined into a
5½ oz. tri-tolyl guanidine      solid solution 100 lbs. total Vulcanized at 40 lbs. steam pressure in from 25 to 35 minutes.

My invention then consists in making use of these mono- and tri-substituted guanidines in a new manner, that initiates quite new and different reactions during vulcanization, and that greatly accelerates the vulcanization of the rubber in which they are employed, giving resultant vulcanized products that are highly improved.

It is to be understood that I do not mean to limit myself to the ingredients, components, or proportions given in this specification, or to merely such examples as have been cited by me, it being readily understood by those well versed in the art, that the said ingredients, components, and proportions may be varied within comparatively wide limits without departing from the principles and purposes of my invention as herein set forth.

Having now described my invention and having shown in what manner the same may be utilized, what I claim as new, and desire to secure by Letters Patent is:

1. A process of vulcanizing rubber which consists in, incorporating into compounded rubber an accelerator comprising a combination of mono-tolyl guanidine with symmetrical tri-tolyl guanidine as a solid solution, then heating the resultant rubber mixture with a vulcanizing agent to effect vulcanization.

2. A process of vulcanizing rubber which comprises, incorporating a vulcanizing agent with compounded rubber, then applying heat and effecting an accelerated vulcanization in the presence of a solid solution of a mono-tolyl guanidine and a symmetrical tri-tolyl guanidine in the ruber mixture.

3. A process of vulcanizing rubber which consists in, incorporating into rubber an accelerator comprising the combination of a solid solution of two or more isomeric mono-tolyl guanidines and two or more isomeric symmetrical tri-tolyl guanidines, then heating the resultant rubber mixture with a vulcanizing agent to effect vulcanization.

4. A process of vulcanizing rubber which consists in, incorporating into compounded rubber an accelerator comprising a combination of mono-substituted guanidine with tri-substituted guanidine, as a solid solution, both guanidines being substituted by aromatic groups derived from primary phenyl amines, and each of the aromatic groups having more than six carbon atoms, then heating the resultant rubber mixture with a vulcanizing agent to effect vulcanization.

5. A process of vulcanizing rubber which comprises, incorporating a vulcanizing agent with compounded rubber, then applying heat and effecting an accelerated vulcanization in the presence of a solid solution of a mono-substituted guanidine and a symmetrical tri-substituted guanidine in the rubber mixture, one of the guanidines being substituted by the tolyl group, the other guanidine being substituted by a group that is homologous to the tolyl group, and derived from a primary phenyl amine, but containing more than six carbon atoms, and the homologous group derived from a primary phenyl amine.

6. A process for accelerating the vulcanization of rubber which comprises combining the rubber with a vulcanizing agent, and a solid solution of mono-substituted guanidine and symmetrical tri-substituted guanidine, the substituted guanidines having hydrocarbon substituting aryl groups derived from primary phenyl amines, and each of the aryl groups having an alkyl substitution for at least one of its hydrogens, and vulcanizing the rubber.

7. A process for accelerating the vulcanization of rubber which comprises combining the rubber with a vulcanizing agent, and a combination of the solid solution of two or more isomeric mono-aryl substituted guanidines and two or more isomeric symmetrical tri-aryl substituted guanidines, and the aryl groups of both guanidines being derived from primary phenyl amines, and vulcanizing the rubber.

8. A vulcanized compound derived from compounded rubber or similar material combined with a vulcanizing agent and a solid solution of mono-tolyl guanidine and symmetrical tri-tolyl guanidine.

9. A process of vulcanizing rubber which consists in, modifying the melting point of symmetrical tri-substituted guanidine, by incorporating mono-substituted guanidine with it into a solid solution as a modified substituted guanidine accelerator, the substituting groups of both guanidines to be aryl groups containing more than 6 carbon atoms and the aryl groups derived from primary phenyl amines, then incorporating the accelerator thus formed into compounded rubber, and then heating the resultant rubber mixture with a vulcanizing agent to effect vucanization.

10. A vulcanized compound derived from compounded rubber or similar material combined with a vulcanizing agent and a solid solution of mono-substituted guanidine and symmetrical tri-substituted guanidine, one of the guanidines being substituted by the tolyl group, the other guanidine being substituted by a group that is homologous to the tolyl group but containing more than 6 carbon atoms, and the homologous group derived from a primary phenyl amine.

GEORGE H. STEVENS.